US008620994B2

(12) United States Patent
Boyd et al.

(10) Patent No.: US 8,620,994 B2
(45) Date of Patent: Dec. 31, 2013

(54) SYSTEM AND METHOD FOR SCHEDULING CONTENT UPDATES IN A CONTENT-BASED APPLICATION

(75) Inventors: John D. Boyd, San Diego, CA (US); Jasmit Singh Kochhar, Tumwater, WA (US); Laurence Lundblade, San Diego, CA (US); Sanika Kapoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1902 days.

(21) Appl. No.: 11/361,393

(22) Filed: Feb. 23, 2006

(65) Prior Publication Data

US 2007/0198698 A1 Aug. 23, 2007

(51) Int. Cl.
*G06F 15/173* (2006.01)
*G06F 15/16* (2006.01)

(52) U.S. Cl.
USPC .......................... 709/203; 709/224; 709/225

(58) Field of Classification Search
USPC ......... 709/203, 220, 221, 222, 223, 224, 225, 709/226, 228, 235, 216, 227, 229, 231, 709/250; 307/229; 455/466, 3.01, 3.03, 455/418, 456.1, 454, 457, 414.1, 414.3, 455/412.1, 556.2, 3.06, 414.2; 711/118, 711/141, 151; 710/36
See application file for complete search history.

(56) References Cited

U.S. PATENT DOCUMENTS

| | | | |
|---|---|---|---|
| 5,210,861 A * | 5/1993 | Shimoda | 714/32 |
| 5,919,247 A * | 7/1999 | Van Hoff et al. | 709/217 |
| 6,167,429 A * | 12/2000 | Mercer et al. | 709/203 |
| 6,408,330 B1 * | 6/2002 | DeLaHuerga | 709/217 |
| 6,996,393 B2 * | 2/2006 | Pyhalammi et al. | 455/412.1 |
| 7,181,492 B2 * | 2/2007 | Wen et al. | 709/204 |
| 7,383,306 B2 * | 6/2008 | Karp | 709/206 |
| 2002/0198923 A1 * | 12/2002 | Hayes, Jr. | 709/102 |
| 2002/0198963 A1 * | 12/2002 | Wu et al. | 709/219 |
| 2003/0106022 A1 | 6/2003 | Goodacre et al. | |
| 2004/0057454 A1 * | 3/2004 | Hennegan et al. | 370/463 |
| 2004/0230747 A1 | 11/2004 | Ims et al. | |
| 2004/0243617 A1 * | 12/2004 | Bayyapu | 707/102 |
| 2006/0069746 A1 * | 3/2006 | Davis et al. | 709/218 |

FOREIGN PATENT DOCUMENTS

GB 2372587 8/2002

OTHER PUBLICATIONS

RandyG, Auto refreshing a web Page, Aug. 10, 2004, Tech Support Guy, forums.techguy.org/web-email/260234-solved-auto-refreshing-web-page.html.*

Paul McFedries, The Complete Idiot's Guide to Creatinga Web Page, Aug. 6, 1997, Fourth Edition, www.mcfedries.com/books/cightml/list/376-2.asp.*

(Continued)

*Primary Examiner* — Ruolei Zong

(74) *Attorney, Agent, or Firm* — Fariba Yadegar-Bandari

(57) ABSTRACT

Described are various mechanisms and techniques for influencing or controlling a content update schedule for a content-based software application on a mobile device. A content server issues one or more commands to the mobile device that establish a content update schedule for the mobile device. The mobile device then performs content update sessions with the content server based on that schedule. During any one or more refresh sessions, the content server delivers another command to establish a new content update schedule. This system provides the advantage of allowing the content server to regulate how frequently the mobile device retrieves new content.

71 Claims, 10 Drawing Sheets

(56) References Cited

OTHER PUBLICATIONS

Yoshimura T et al: "Content Delivery Network Architecture for Mobile Streaming Service Enabled by SMIL Modification" IEICE Transactions on Communications, Communications Society, Tokyo, JP, vol. E86-B, No. 6, Jun. 2003, pp. 1778-1787, XP008036766 ISSN: 0916-8516 abstract.

International Search Report and Written Opinion—PCT/US2007/062733, International Search Authority—European Patent Office—Jul. 16, 2007.

* cited by examiner

SYSTEM AND METHOD FOR SCHEDULING CONTENT UPDATES IN A CONTENT-BASED APPLICATION

BACKGROUND OF THE INVENTION

1. Field of the Invention

The present invention generally relates to content-based software applications. More particularly, the invention relates to software applications that periodically retrieve content from a remote location.

2. Description of the Related Art

Information is available today to a degree that eclipses anything humans have ever experienced. The Internet is one component responsible for making the dissemination of information so simple. The broad, even worldwide reach of the Internet makes information that develops anywhere on the planet instantly accessible to anyone else on the planet that happens to have an Internet connection. This degree of instant accessibility has transformed people's view of what "current information" really is. For some people in some circumstances, information that is older than 15 minutes is ancient history—yesterday's news.

But the Internet is not alone in the transformation of information accessibility. Wireless networking has also played a major role. As people have become more accustomed to having instant access to information on their desktop computers, they have become intolerant of not having that access while away from their computers. Even a short drive in the car makes some people nervous about what they are missing. The wireless industry, and in particular the wireless telecommunications industry, is addressing that need.

Today people can use mobile devices, such as cellular telephones and personal digital assistants (PDA's), to stay in touch while away from a more conventional means of communication. Mobile device manufacturers are empowering those devices with the ability to keep the user in touch with the information superhighway. New applications and services are constantly being developed to enable users to retrieve their valuable (and sometimes invaluable) information using their mobile devices.

However, information accessibility on mobile devices is still in its infancy, relatively speaking. Conventional, even cutting-edge technologies are often inefficient when retrieving new information. Conventional mechanisms constantly struggle to find the balance between trying to keep the user up-to-date on their mobile device, while not wasting bandwidth or network usage if no new information is available. For instance, a content-based application on a mobile device, by definition, doesn't know what is available at a content server until it connects to the content server. This paradox leads to one of the most stymieing problems facing the developers of mobile devices and content-based services—how often should the mobile device connect to the server to retrieve new information?

An adequate solution to this problem has eluded those skilled in the art, until now.

SUMMARY OF THE INVENTION

The invention is directed at issuing commands to a mobile device on which resides a content-based application. In one aspect, the invention provides a system for influencing a content update schedule on a mobile device. The system includes a server configured with a processor, a memory, and a storage medium. The storage medium is encoded with a server application that, when executed by the processor, runs in the memory and causes the server to create a refresh command including a repeatdelay parameter that specifies a period during which a subsequent refresh command should not be executed. The server is further caused to issue the refresh command to a mobile device having a content-based application configured to retrieve content from a content server. The refresh command, if executed on the mobile device, causes the mobile device to initiate a content update session.

In another aspect, the invention provides a system for scheduling a content update. The system includes a mobile device configured with a processor, a memory, and a storage medium. The storage medium is encoded with a command queue and a content-based application that, when executed by the processor, runs in the memory and causes the mobile device to monitor the command queue for commands that are due for execution, and if a refresh command in the command queue is due for execution and is not prohibited from execution by a prior refresh command, to execute the refresh command by contacting a content server identified in the refresh command and requesting a content update session, and further to receive a new refresh command configured for execution at a predetermined time in the future.

In yet another aspect, the invention provides a method and a computer-readable medium encoded with instructions for influencing a content update schedule on a mobile device. The method and instructions include creating a refresh command that, if executed, causes a mobile device to perform a content update that includes contacting a content server to initiate a content update session, the refresh command including a parameter that specifies a time when the refresh command should be executed; and issuing the refresh command to the mobile device In still another aspect, the invention provides a method and a computer-readable medium encoded with instructions for scheduling a content update. The method and instructions include receiving a refresh command that specifies a time when the refresh command should be executed and a period during which a subsequent refresh command should not be executed; storing the refresh command in a command queue on a mobile device; monitoring the command queue to determine if any commands in the command queue are due for execution; and when the refresh command has become due for execution, executing the refresh command by contacting a content server and initiating a content update session.

BRIEF DESCRIPTION OF THE DRAWINGS

With reference to the figures in which like numerals represent like elements throughout.

DETAILED DESCRIPTION OF THE INVENTION

What follows is a detailed description of various mechanisms and techniques for controlling a content update schedule for a content-based software application on a mobile device. A content server issues one or more commands to the mobile device that establish a content update schedule for the mobile device. The mobile device then performs content update sessions with the content server based on that schedule. During any one or more refresh sessions, the content server delivers another command to establish a new content update schedule. The command may include a parameter that identifies a period during which the command should not be repeated. This system provides the advantage of allowing the content server to regulate how frequently the mobile device retrieves new content.

System Overview

Figure 1:
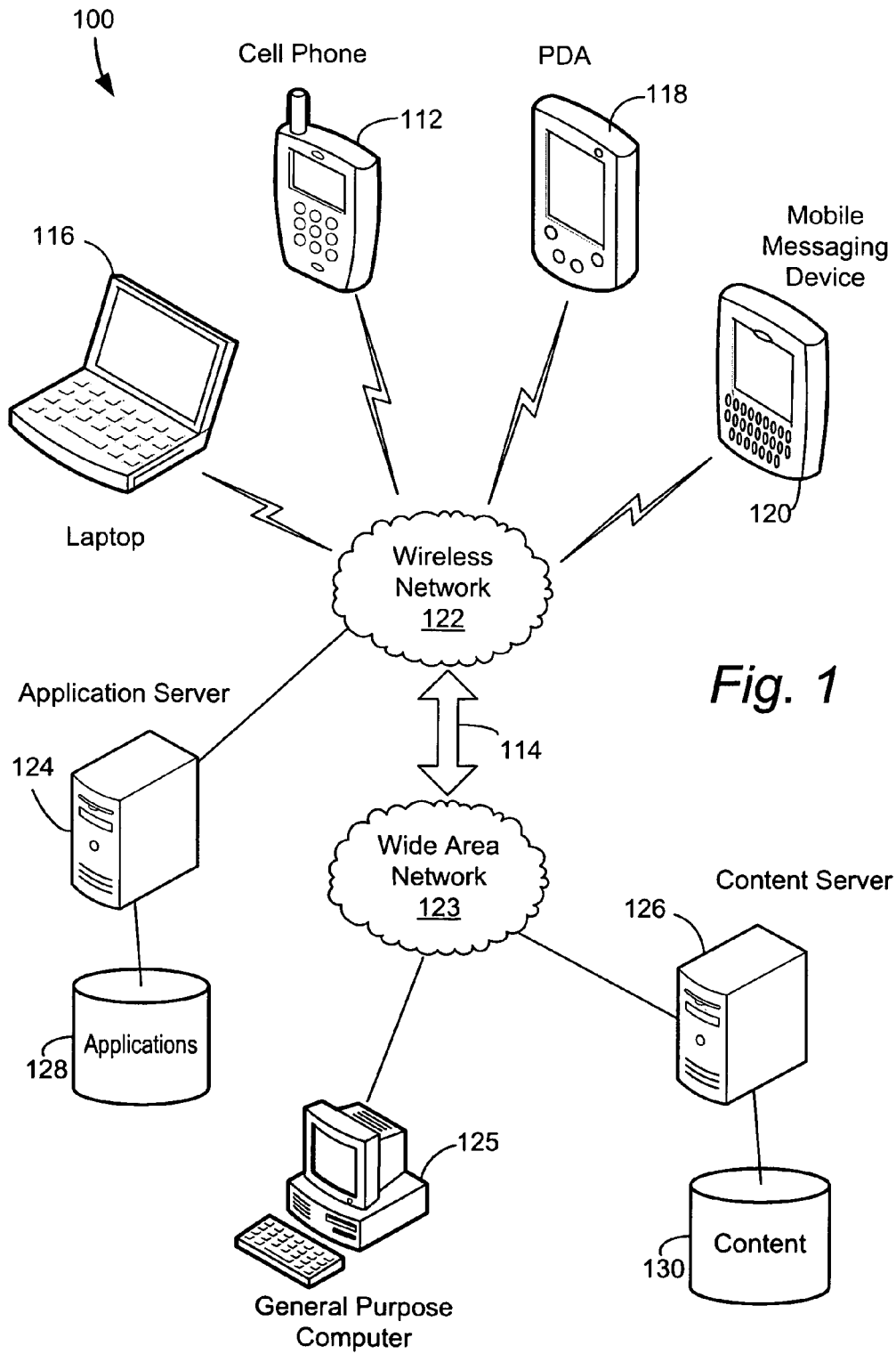
FIG. 1 is a functional diagram of a communications environment in which mobile devices using content-based applications may operate.

FIG. 1 is a functional diagram of a communications environment 100 in which mobile devices using content-based applications may operate. In this example, the communications environment 100 includes a wireless network 122 and a wide area network ("WAN") 123. The wireless network 122 may be any communications network operated by a wireless service provider to provide data or telecommunications connectivity to mobile devices. In one example, the wireless network 122 may be a cellular telephone network. Several mobile devices are in communication with the wireless network 122, such as a cellular phone 112, a laptop computer 116 with wireless communications capability, a wireless PDA 118, and a mobile messaging device 120. These devices are only shown as illustrative of the many types of devices that may communicate over the wireless network 122.

The WAN 123 may be any network that enables data communication between and among multiple computing devices. One example of such a computing device is a general purpose computer 125 that may be used to issue electronic messages to a mobile device, such as the mobile messaging device 120. The WAN 123 may be a privately accessible network, such as an enterprise network or the like, or it may be a publicly accessible network, such as the Internet. The WAN 123 and the wireless network 122 are also coupled via a communications channel 114 to enable the mobile devices to communicate with devices on the WAN 123.

Illustrated in FIG. 1 are an application server 124 and a content server 126. The content server 126 is a computing device that serves data or other content 130 that changes over time. Many different examples exist, such as news servers, stock quote servers, weather information servers, sports information portals, special purpose information portals, messaging servers, and the like. The type of information that can be made available is limitless, and very many different examples will be apparent to those skilled in the art. The content server 126 includes server software that is configured to provide the content 130 to requesting devices over the WAN 123.

The application server 124 is a computing device or system coupled to the wireless network 122 that makes software applications 128 available for download by the mobile devices. The applications 128 may be made available for free, for a fee, on a subscription basis, or in any other manner. Generally stated, the applications 128 are downloadable by the mobile devices, such as the cellular phone 112, for execution on those devices. In this particular implementation, at least one of the applications 128 served by the application download server 124 is a content-based application configured for execution on at least one of the mobile devices. The content-based application (the client) is configured to retrieve content from the content server 126 for presentation by the mobile device.

Briefly stated here and described in greater detail below, a mobile device, such as the cellular phone 112, includes a content-based application referred to as a "content client" or simply as a "client." The mobile device may come pre-configured with the client, or it may be downloaded from the application server 124. The client is configured to process commands issued by the content server 126 that influence, control, and/or modify a content update schedule for the client's content. The content update schedule is the time period between successive content updates. In other words, when the client on a mobile device retrieves new content, the content server 126 may return one or more commands with the new data to control when the mobile device next automatically retrieves more new content. Alternatively, the content server 126 may issue asynchronous commands to the mobile device to schedule a content update. In these ways, the content server 126 may regulate how often the mobile device connects to retrieve new content. This feature has the advantage of enabling the content server 126, which has the best knowledge about when new content is or will be available, to control the client's content update schedule. Specific details about one particular implementation of this mechanism are provided below.

Specific Implementation Details

Figure 2:
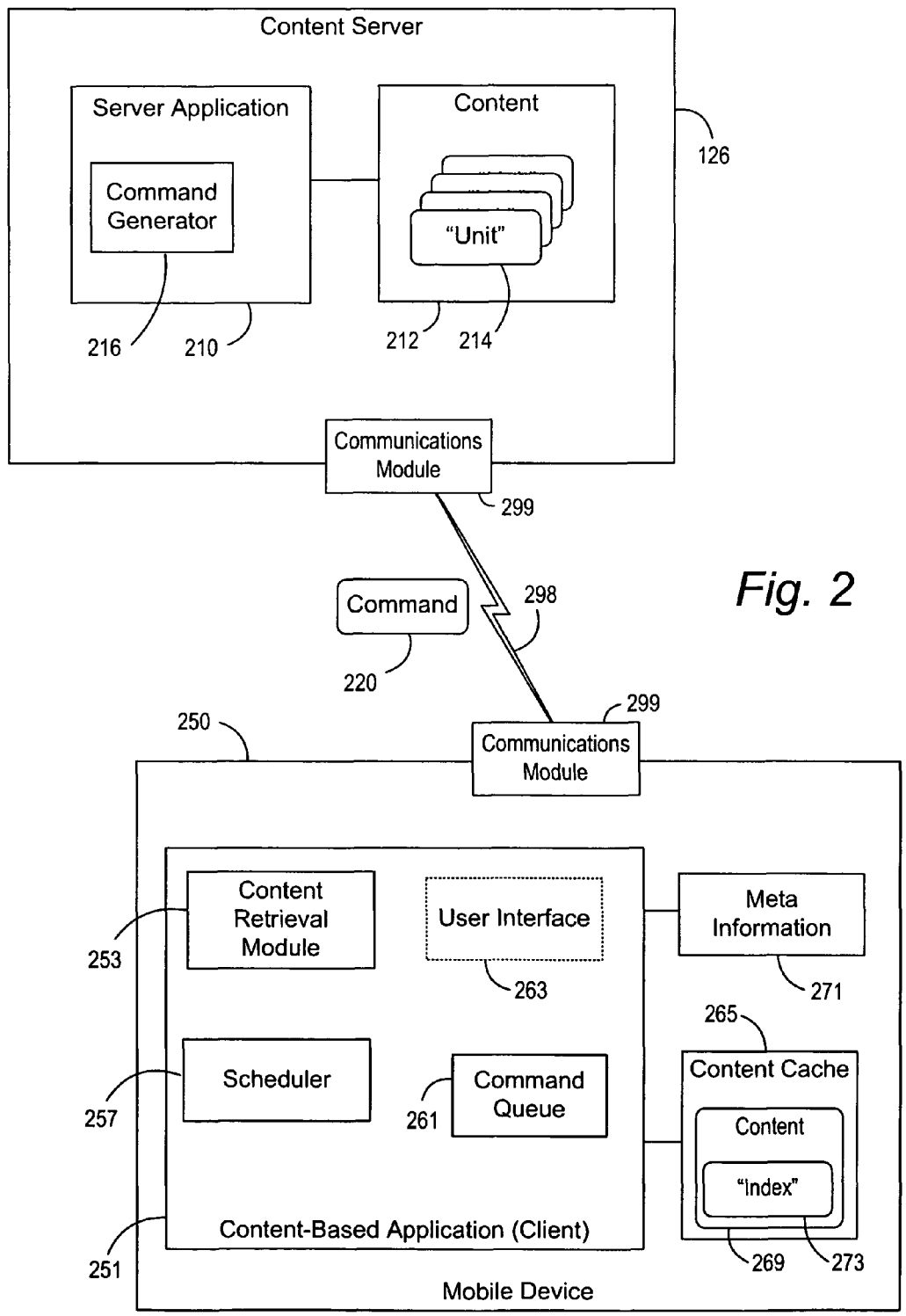
FIG. 2 is a functional block diagram that more fully illustrates components and interactions of the content server and a mobile device configured in accordance with one implementation of the invention.

FIG. 2 is a functional block diagram that more fully illustrates components and interactions of the content server 126 and a mobile device 250 configured in accordance with one implementation of the invention. Generally stated, the content server 126 makes content 212 available for retrieval by or delivery to the mobile device 250. The mobile device 250 and the content server 126 communicate over a communication link 298 using conventional communications modules 299, which may be implemented as any combination of wireless and/or wired communications mechanisms.

The Server

The content server 126 includes a server application 210 and content 212. The server application 210 is operative to make the content 212 available for retrieval by or delivery to other computing devices, such as the mobile device 250. In this particular implementation, the content 212 is composed of individual "units" 214, which are the basic structure of the data transmitted to the receiving devices. Briefly stated, a unit 214 may contain any form of usable digital data, such as a single bit of text, a single image, or the like. In addition, the unit 214 may contain more complex bundled content, such as a HyperText Markup Language ("HTML") or a Synchronized Multimedia Integration Language ("SMIL") document with multiple images, sounds, and script components. The units used in this particular implementation are described in greater detail below in conjunction with FIG. 3.

In addition to delivering content 212 upon request, the server application 210 includes a command generator 216 that is configured to generate one or more commands (e.g., command 220) for delivery to the mobile device 250. A command may take the general form of:

Cmd:command<parameters>

In this example, the "Cmd:" is a prefix that introduces what follows as a command, the "command" portion includes the name of the particular command being given, and the "<parameters>" portion includes one or more parameters that modify the command. A listing of several commands that may be used in this implementation are detailed in the "Commands Table" provided below in the Appendix. Of particular note is a "refresh" command, which when executed on the mobile device 250 causes it to perform a content update.

The command generator 216 may add one or more parameters to the command to affect how and when the command is executed. A listing of several parameters that may be used in this implementation are detailed in the "Parameters Table" provided below in the Appendix. However, certain parameters of particular note are described here.

A "time" parameter may be used to provide a date and time to execute the corresponding command. The use of the time parameter in combination with the refresh command allows the server application 210 to instruct the mobile device 250 to perform a content update at a particular date and time. For instance, a stock quote server could use this parameter to schedule stock quote subscribers to perform a content update when the markets close.

A "repeatdelay" parameter can be used to specify that a command should be executed only if a similar command has not already been performed within a certain time interval. A command that includes this parameter should be dropped if an identical command was executed within the specified time period. For example, in certain implementations commands may be delivered using a "push" type of transport. If the mobile device 250 is powered down for an extended period of time, a series of similar or identical commands may accumulate. When the mobile device 250 is powered on, this backlog of commands may be received simultaneously. The "repeatdelay" parameter would allow only one of those commands to be executed, and the others would be discarded.

An "expires" parameter can be used to indicate a particular date and/or time after which the command is to be discarded if it has not been executed. This parameter is useful in a situation where time sensitive content becomes outdated in a predictable way, such as sports scores or weather reports.

Some parameters can be used to specify how to retry the command should it fail. A "retrycount" parameter can be used to specify the number of times to retry a command until successful completion. A "retrymin" parameter can be used to specify how long to wait between retries. If the command fails to properly execute due to some network problems, for example, these parameters can be used to re-schedule the command for later execution until either it completes successfully or until the number of retries has been exceeded.

The command generator 216 may be configured to actually generate the commands at any appropriate time, such as periodically and/or asynchronously. Commands could be generated periodically in cases where the content changes regularly, such as stock quotes or the like. Asynchronous commands could be generated, for instance, when new content becomes available at the content server 126, such as when new electronic messages arrive. Additionally, the command generator 216 may generate commands in response to some event, such as the initiation of a content update session by the mobile device 250.

The server application 210 can be configured to transmit commands in different ways and at different times, likely depending on the way in which the mobile device 250 retrieves the content 212. For example, the server application 210 could be configured to deliver commands when the mobile device 250 contacts the content server 126 and requests a content update. This approach may be very practical in cases where regular content updates should occur. Alternatively, the server application 210 could be configured to deliver commands to the mobile device 250 at arbitrary times using a "push" type delivery mechanism, such as the Short Message Service ("SMS") or the like. This approach may be better in cases where it is unpredictable when new content may arrive, such as with critical news updates or electronic messages.

Commands may be sent to the mobile device 250 using any one or more of many different protocols. For example, if the HyperText Transfer Protocol ("HTTP") is used to transmit the content 212, then the command 220 may be included in HTTP headers alongside the transmitted content itself. If the server application 210 provides the content 212 in a multipart message format, such as the Multipurpose Internet Mail Extensions ("MIME") format, it may include the command 220 as a header within a preamble of the transmitted content. If the server application 210 provides the content 212 in a format that supports hyperlinks, it may include the command 220 directly in the transmitted content itself, which may be executed when invoked by the user. In addition, the server application 210 could push the command 220 to the mobile device 250 using a mechanism like SMS.

The Client

The mobile device 250 includes at least one content-based application (client 251) that is operative to retrieve content 212 for display or use on the mobile device 250. There are many examples of the type of application that may be implemented by the client 251. For instance, the client 251 may be configured to retrieve stock quotes, news alerts, weather information, sports scores, electronic messages, or any other content. The client 251 is responsible for retrieving new content 212 based on some content update schedule.

Figure 5:
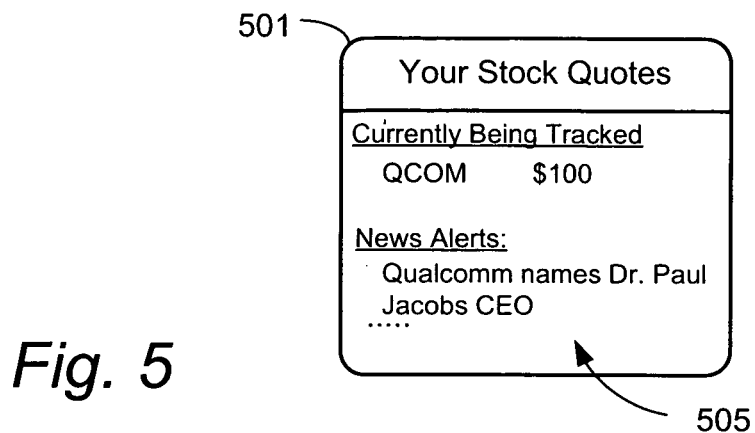
FIG. 5 is graphical representation of a sample display that may be presented by a content-based application on a mobile device.

In this implementation, the client 251 includes a content retrieval module 253 configured to retrieve the content 212 from the content server 126 and to store it as local content 269 in a local content cache 265. As mentioned above, the client 251 makes the local content 269 available for use on the mobile device 250, such as for viewing by a user, for manipulation by another installed application, or in any other way. The client 251 may optionally include a user interface 263 configured to render and display the local content 269. For example, referring briefly to FIG. 5, the mobile device may include a display 501 on which the user interface presents the content in some usable fashion. In this example, the client is a stock quote application and the content 505 being displayed includes stock quotes and stock new alerts.

Returning to FIG. 2, in this implementation, the client 251 is configured to display a default start-up unit, such as an "index" unit 273. The default start-up unit may be identified in meta information 271 for the client 251. After start-up, the client 251 maintains the notion of a "current unit" or last displayed unit. The "current unit" is updated as the user navigates through different units using the client 251.

The client 251 presents functionality similar to conventional web browsers in that the client 251 retrieves content from remote locations over a wide area network. However, the client 251 differs from conventional web browsers in many important aspects. For instance, the client 251 can pre-fetch the content 212 to the local content cache 265 before a user requests to view or work with the content. In addition, the client 251 may be implemented without any user interface or controls of its own.

The client 251 receives commands, such as command 220, from the content server 126. As mentioned above, the commands may be received in one or more of many different ways, such as in an SMS message or with (or part of) the content tent 212 during a content update. When a command is received, the client 251 puts the new command 220 in a command queue 261.

A 'scheduler' 257 continuously monitors the command queue 261 and performs actions on those commands as necessary. The scheduler 257 runs in the backgrounds ground even if the user is not actively using the client 251 or another application supported by the client 251. The scheduler 257 may evaluate the command queue 261 to determine which commands are due for execution. As mentioned above, commands may be scheduled for execution in the future through the use of certain parameters, such as the 'time' parameter.

The scheduler 257 may remove duplicates from the command queue 261, such as may occur if the content server 126 delivers the same command twice. Similarly, if a new command includes a "repeatdelay" parameter (described above), the scheduler 257 may determine if the same command has already been executed within the repeatdelay value. If so, the scheduler 257 may discard the new command. In addition, the scheduler 257 may eliminate any commands that have expired without being executed.

At the time specified in the command, the scheduler 257 causes the client 251 to execute the command if possible. In some cases it may not be possible to execute the command precisely at the specified time. For example, if the mobile device 250 is powered off or without a connection to the content server 126, the command might not be executed. In those cases, the command may be executed as soon as possible, such as when the mobile device 250 is powered back on or once again has network connectivity. If a command that includes retry parameters fails for some reason, the scheduler 257 places the command back into the command queue 261 and retries it later, as governed by these parameters. The scheduler 257 removes the commands from the command queue 261 once successfully completed or expired.

By way of example, suppose the new command 220 takes the following form:

Cmd:refresh?url=http://contentserver.com/stuff;
time=14Oct200713:16GMT

In this example, the command is a refresh command and includes two parameters separated by a semicolon (";"). As mentioned above, the refresh command is an instruction to the client 251 to perform a content update. The first parameter in the command ("url=") identifies the particular content to be retrieved and its location. More specifically, the unit 'stuff' is to be retrieved from the location "http://contentserver.com". The second parameter ("time=") specifies when the command is to be executed. In this implementation, the "time" parameter is treated as a "not-earlier-than" instruction, meaning that the command may be executed at any time after the specified time unless contravened by another parameter. Accordingly, this example instruction is intended to cause the client 251 to perform a content update on the 14 Oct. 2007 at 13:16 Greenwich Meridian Time by retrieving the unit "stuff" from the domain "contentserver.com" using the HTTP protocol.

As demonstrated, a typical refresh command contains the address of the server to contact and identifies the content to fetch. The typical refresh command is scheduled to execute at some time in the future. However, in some cases the refresh command may be configured for immediate execution, such as to cause the client 251 to retrieve an important message that just arrived at the content server 126.

The refresh command could also instruct the client 251 to perform a content update but without fetching any content at all. This may be used to instruct the client 251 to simply connect and receive a future refresh command without downloading any other data.

When the client 251 executes the refresh command, it connects to the location specified in the command (e.g., the content server 126) and requests the content specified in the command. The refresh command may instruct the client 251 to fetch all of the content 212 or any subset of the content 212, depending on how the content server 126 constructed the command. For instance, in situations where the content 212 is large but is mostly constant over time (that is, only small bits of it change), the content server 126 may construct refresh commands that instruct the client 251 to fetch only a small subset of the content 212. In one example, a stock application executing on a content server may have a fancy display page with images and other static resources. In this case, the stock application may issue refresh commands to the client to only fetch new stock prices (i.e., a subset of the content 212). Conversely, in situations where most of the content changes at once, the content server 126 will instruct the client 251 to fetch all of the content rather than just parts. For example, a content server hosting an application that displays weather reports will typically instruct the client 251 to fetch everything, since the entire report changes from update to update.

In another example, the refresh command may include other parameters:

Cmd:refresh?url=XX;time=XX:00;repeatdelay=20;
displayafter=result;playafter=tune In this example, the refresh command will fetch content from some URL, abbreviated here as "XX," at time "XX:00." After the fetch is complete, the unit "tune" (e.g., a media file) will be played and the unit "result" will be displayed to indicate completion. These two units may or may not have been downloaded with this refresh command.

In addition, the "repeatdelay" parameter defines 20 minutes as the period during which the command should not be repeated or executed again. Accordingly, any attempt to execute an identical refresh command within 20 minutes (the "repeatdelay" period) of executing the above command will be ignored. As mentioned, this is helpful in situations where several refresh commands may arrive at a mobile device at once, such as when the device is first powered on after a lengthy time powered off. In such a case, there is no need to execute the refresh command multiple times when once will do. Accordingly, the repeatdelay parameter allows those subsequent commands that attempt to refresh the same content to be ignored. It will be appreciated that a subsequent refresh command that refreshes different content should not be ignored, and should be unaffected by the earlier repeatdelay parameter.

Commands and parameters could also be abbreviated, and the "Cmd:" prefix could be omitted. Thus one possible representation of a refresh command that causes the unit "baboon.jpg" to be fetched from the domain "server.com" could be:

r?u=http://server.com/baboon.jpg

In this example, the "r" is an abbreviation for "refresh," the "u" is an abbreviation for "URL," and the prefix "Cmd:" has been omitted. Abbreviating the commands is very useful when sent via a protocol with severe size restrictions like SMS where messages currently cannot exceed about 100 characters. Many other alternatives will also become apparent to those skilled in the art.

In summary, the use of the refresh command coupled with various parameters of the kind described above, allows the content server 126 to control or influence when the client 251 performs its content updates as well as what content to retrieve. In this way, the content server 126 can regulate the content update schedule of the client 251, which provides greater efficiency because the content server 126 has the best knowledge of what the content update schedule should be.

It should be noted that certain components have been described here as a single module of code to illustrate certain functionality provided by the client 251. However, that functionality equally may be embodied in a single executable software module or it may be distributed throughout different software modules of the client 251. The use of single components in this description is for simplicity of discussion only, and is not necessary to a proper functioning of any implementation of the invention.

What follows is a more focused description of the nature and structure of the "units" that form the basic construct for content that is transmitted. Following that is a more focused description of particular implementations of the delivery transport that may be used to communicate the content, including commands, from the content server 126 to the mobile device 250.

One Implementation of "Units"

Figure 3:
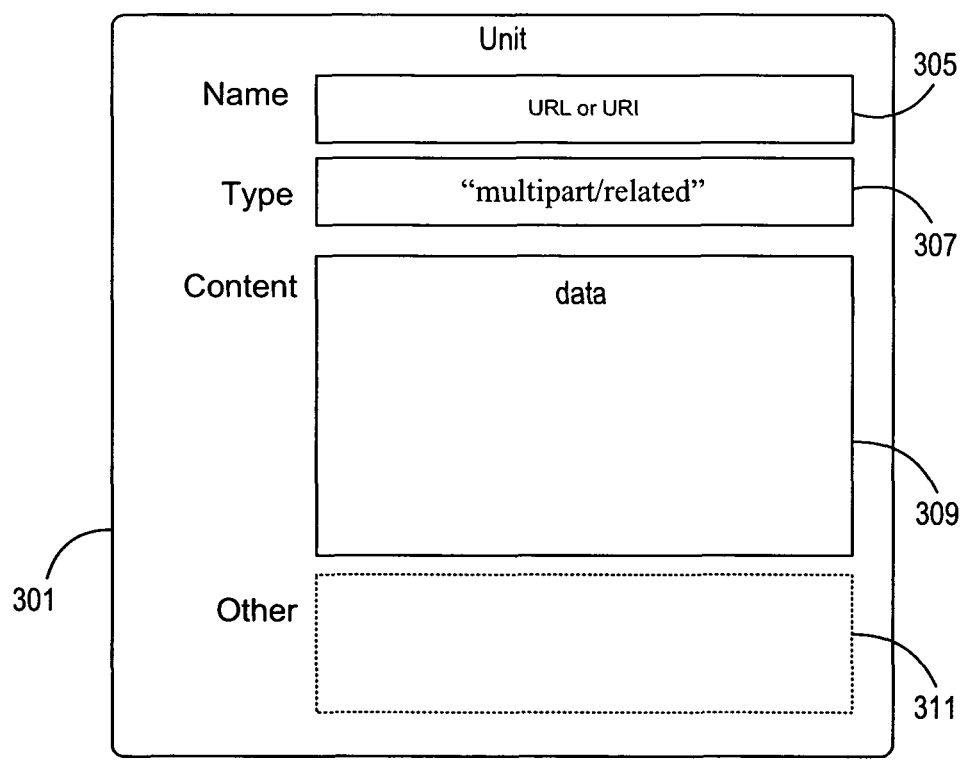
FIG. 3 is a conceptual illustration of a "unit" that may be used in implementations of the present invention.

FIG. 3 is a conceptual illustration of a "unit" 301 that may be used in implementations of the present invention. Content-based applications (e.g., client 251 in FIG. 2) can have static content that doesn't change, content that is pushed by some store-and-forward service, or content that is pulled. Conceptually, the "unit" is whatever is stored, pushed, or pulled.

The unit 301 could roughly correspond to a displayed page of content, like an HTML page, but this is only one use. For example the unit 301 could also be an image that is part of a Web page where the image is updated independent of the Web page.

The developer of a content-based application can design the particular format of its units based on various criteria, such as performance impact, network usage, available device storage, and the like. In that regard, fewer large units would be simpler to maintain and implement, but make updates larger and take longer. Conversely, a larger number of smaller units would make content updates quicker and more efficient, but would be more difficult to maintain.

Referring now to FIG. 3, the unit 301 includes three fundamental characteristics: a name 305, a type 307, and some content 309. The unit 301 could also optionally include other information 311, such as meta information about the unit 301. In its simplest form, the unit 301 could simply be a file, such as an image file. In one example, the unit 301 could be an image file named "monkey.jpg". The unit's name 305 would then be "monkey.jpg" and its content 309 would be the digital image data. The unit's type could either be inferred from its name 305 (e.g., ".jpg" means a JPEG image) or implicit given the particular format of the content 309. The unit's type could also be explicit using a type indicator, such as a MIME type of "image/jpeg" or the like.

Alternatively, or in addition, the unit 301 could be more complex. For example, the unit 301 could be a MIME entity, such as a MIME structured RFC822 message formatted in HTML with embedded images. In this case, the name 305 could include the subject of the message (e.g., "dear mom"), the type 307 could include the unit's MIME type (e.g., "message/rfc822"), and the content 309 could include the e-mail message.

Similarly, the unit 301 could be an HTML page whose type 307 is "multipart/related", and the content 309 would then contain the HTML page and the page's constituent images, sounds, and the like. This MIME type is in common use for e-mail transmission, but is not commonly used with HTTP to transmit ordinary web pages.

The unit's content 309 can be of any format that is usable by the client and the mobile device on which the client resides. For example, the client could accept plug-ins for proprietary formats. In that case, the content 309 could be in those proprietary formats.

Although ordinarily only a single unit is transmitted at a time, in some cases it may be more efficient to transmit multiple units in the same transaction or message. For that reason, a special type of unit may be implemented to support transmitting multiple units as a single unit. In one example, a special aggregated MIME type may be used, such as "multipart/x.content-aggregate." The aggregated MIME type may be a simple multipart structure the content of which is other units.

Illustrative Transport Implementations

Figure 4:
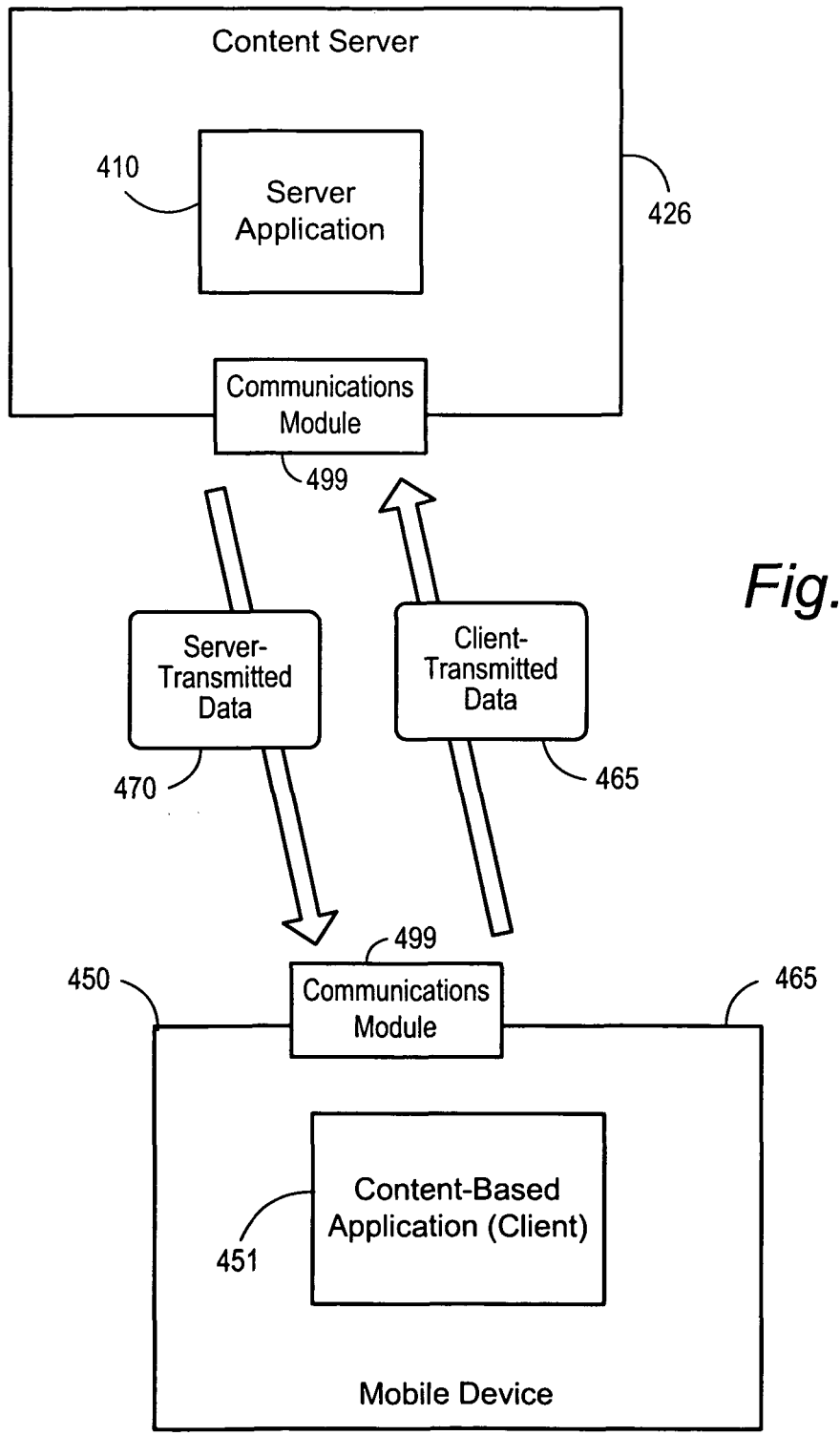
FIG. 4 is a functional block diagram generally illustrating a content server having a content-based server application and a mobile device having an installed content-based application.

FIG. 4 is a functional block diagram generally illustrating a content server 426 having a content-based server application 410 and a mobile device 450 having an installed content-based application (client 451). The server application 410 and the client 451 communicate using conventional communications modules 499 through one or more of several different communications protocols. In this example, the server application 410 and the client 451 communicate to exchange data: client-transmitted data 465 and server-transmitted data 470. The client-transmitted data 465 may include information such as requests from the client 451 to refresh content stored at the mobile device 450. The server-transmitted data 470 may include information such as new content and/or new commands transmitted by the content server 426.

In this particular implementation, content can arrive at the mobile device 450 in one or more of three ways. The content could be installed on the mobile device 450 when the client 451 is initially installed, it may be pulled by the client 451 from the content server 426 using HTTP or a similar protocol, or it may be pushed to the client 451 using a similar protocol. In addition, pulling the content could be triggered by sending the client 451 an SMS message. What follows is a general discussion of particular implementation details for these transport mechanisms.

HTTP Transport

When the client 451 retrieves content using the HTTP protocol, such as by performing an HTTP fetch, headers may be exchanged between the client 451 and the server application 410 to facilitate the transaction. For example, the client 451 may send headers in the client-transmitted data 465 with a refresh request that describe the mobile device 450 or the state of the mobile device 450. Similarly, the server application 410 may return standard cookies in the server-transmitted data 470 for use in future content updates.

Headers may either be transmitted automatically or not. In one particular implementation, the desired headers are explicitly requested. One technique to achieve this is to include a "header" parameter in the command that causes the communication between the client 451 and the server application 410, such as the refresh command described above. With this technique, a list of desired headers is specified with an "hdr" parameter. One example of a command formatted in this manner might take the following form:

Cmd:refresh?url=http://contentserver.com/flowers.jpg; hdr=min,pid

This command, being a refresh command, causes the client to fetch the file "flowers.jpg" from the domain "contentserver.com". Note that the command instructs the client 451 to transmit two headers with the HTTP fetch when executing the command: the phone number ("min") and the platform ID ("pid") of the mobile device 450. It will be appreciated that the server application 410 can use this technique when constructing a refresh command that will be delivered to the client 451. By including the "hdr" parameter in the refresh command when created, the server application 410 can ensure that the client 451 returns information that the server application 410 knows in advance it will need when handling the refresh command, thus increasing the efficiency of the process.

In another example, an "Accept" header may be sent by the client 451 each time a command is executed that causes communication between the client 451 and the server application 410, such as the refresh command. The "Accept" header may be sent regardless of whether the server application 410 requested it. The client 451 may send the "Accept" header to list the MIME types supported by and the screen size of the device. The following is one example of such a header that may be included in the client-transmitted data 465:

Accept: message/x.bmime, text/html, text/plain, image/png, multipart/x.content-aggregate; width=100; height=120; depth=16

Note that this example "Accept" header identifies several MIME types that are supported by the mobile device 450, and the screen size of the mobile device 450 so that images returned my be appropriately sized for display.

The client 451 may transmit many other headers to include various information. However, some headers could reveal data about the mobile device 450 that may be considered private or restricted. For that reason, permission level requirements may be imposed on the client 451 and/or the server application 410 to enable access to certain information. For example, the GPS location of the mobile device 450 may be available only to applications that are properly approved.

The server application 410 may also transmit headers to the client 451 in the server-transmitted data 470. For example, when transmitting content, the server application 410 should transmit a header that identifies the name of the unit being transmitted, such as a "Unit-name" header. The server application 410 may also send a "Content-type" header that identifies the MIME type of the corresponding unit being transmitted.

A more extensive list of headers that may be transmitted by either the client 451 or the server application 410 in conjunction with the HTTP or similar protocol is provided below in the Appendix.

SMS Trigger

In some situations, it may become beneficial for the server application 410 to cause the client 451 to perform an unscheduled content update. In those cases, the server application 410 may issue an asynchronous message to the mobile device 450 which is in turn intended for the client 451. The SMS transport is well suited to this purpose. In such an implementation, the format of the SMS message could be generally the same as commands. For example, the following SMS message may be sent:

Cmd:refresh?url=http://server.com/baboon.jpg;url=http://server.com/orange.jp g

In this example, the "cmd:" prefix indicates to the mobile device 450 that the SMS message is intended for the client 451. Accordingly, the message is passed to the client 451 for handling. In this particular implementation, the commands that can be sent using the SMS transport may be limited due to the lack of authentication using SMS. For instance, the "refresh" command could be the only command that will be executed when received in an SMS message since it forces a connection to the content server 426, which involves authentication. If another asynchronous transport is used that does provide for authentication, this limitation could be relaxed or eliminated.

It should be noted that abbreviating commands may be especially helpful when using SMS. Accordingly, the refresh command above may be abbreviated as:

r?u=http://server.com/baboon.jpg;u=http://server.com/orange.jpg

Furthermore, a "setvar" command (described below) may be used to further abbreviate the command. For example, the server may have previously issued the command:

setvar?baseurl=http%3A%2F%2Fserver.com

This would have achieved the purpose of setting a base URL of "http://server.com". Thus, enabling the above refresh command to be further abbreviated as:

r?u=baboon.jpg;u=orange.jpg

Aggregated Transport

As discussed above, it may sometimes be beneficial to transmit more than a single unit in one transaction. The special aggregated MIME type described above (i.e., "multipart/x.content-aggregate") may be used for that purpose. When transmitting an aggregated unit, each sub-unit should have a "Unit-Name" header so that the sub-units may be distinguished. In addition, each sub-unit's type could be identified in the normal manner, such as with a "Content-type" header.

When the client 451 receives a unit of this aggregated type, the client 451 parses the aggregated unit and stores each of its constituent sub-units separately. In this particular implementation, an aggregated unit may be nested within another aggregated unit. In such a case, the topmost unit should be identified as an aggregated unit or the client 451 may not be able to determine that the unit should be parsed and expanded. However, particular design considerations may place a limit on how deep aggregated units may be nested. For instance, in one implementation, only one level of aggregated units may be allowed within the topmost aggregated unit.

Note again that the "multipart/x.content-aggregate" unit type is not intended to include content for display, although it could be adapted in that fashion. Rather, in this particular implementation it is used to bundle other units for transport.

Sample Computing Environments

What follows here are illustrative computing environments in which aspects of the invention may be implemented. First is a sample mobile device in which a content-based application may be implemented, and next is a sample computing device in which a content-based server application may be implemented.

Figure 6:
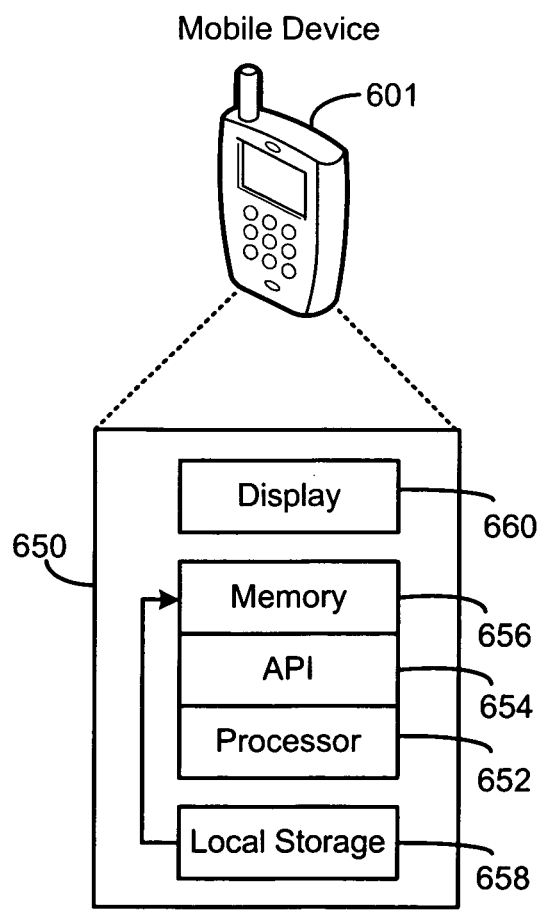
FIG. 6 is a functional block diagram generally illustrating the core components of a sample mobile device in which implementations of the invention are particularly applicable.

FIG. 6 is a functional block diagram generally illustrating the core components of a sample mobile device 601 in which implementations of the invention are particularly applicable. The mobile device 601 could be any device having computing functionality, such as a cellular telephone, a personal digital assistant, a handheld "palmtop" device, a laptop computer, a portable music player, a global positioning satellite (GPS) device, or the like.

The mobile device 601 has a computer platform 650 that can receive and execute software applications and display data. The computer platform 650 includes a processor 652, such as an application-specific integrated circuit "ASIC", digital signal processor ("DSP"), microprocessor, microcontroller, logic circuit, state machine, or other data processing device. The processor 652 executes the application programming interface ("API") layer 654 that interfaces with any resident programs in the memory 656 of the mobile device. The memory 656 can include random-access or read-only memory (RAM or ROM), EPROM, EEPROM, flash memory, or any memory common to computer platforms. The computer platform 650 also includes a local storage 658 that can hold software applications, file, or data not actively used in memory 656, such as software applications or content downloaded from the content server 126 (FIG. 2). The local storage 658 is typically comprised of one or more flash memory cells, but can be any secondary or tertiary storage device as known in the art, such as magnetic media, EPROM, EEPROM, optical media, tape, or soft or hard disk.

The computer platform 650 also includes a display 660 that may be used by the software applications to display data. The display 660 may optionally include touch sensitive capability.

The components shown in FIG. 6 are typical of many types of mobile devices, but it will be appreciated that other components may be added to the mobile device 601 and in certain rare cases, some components shown in FIG. 6 may be omitted from the mobile device 601.

Figure 7:
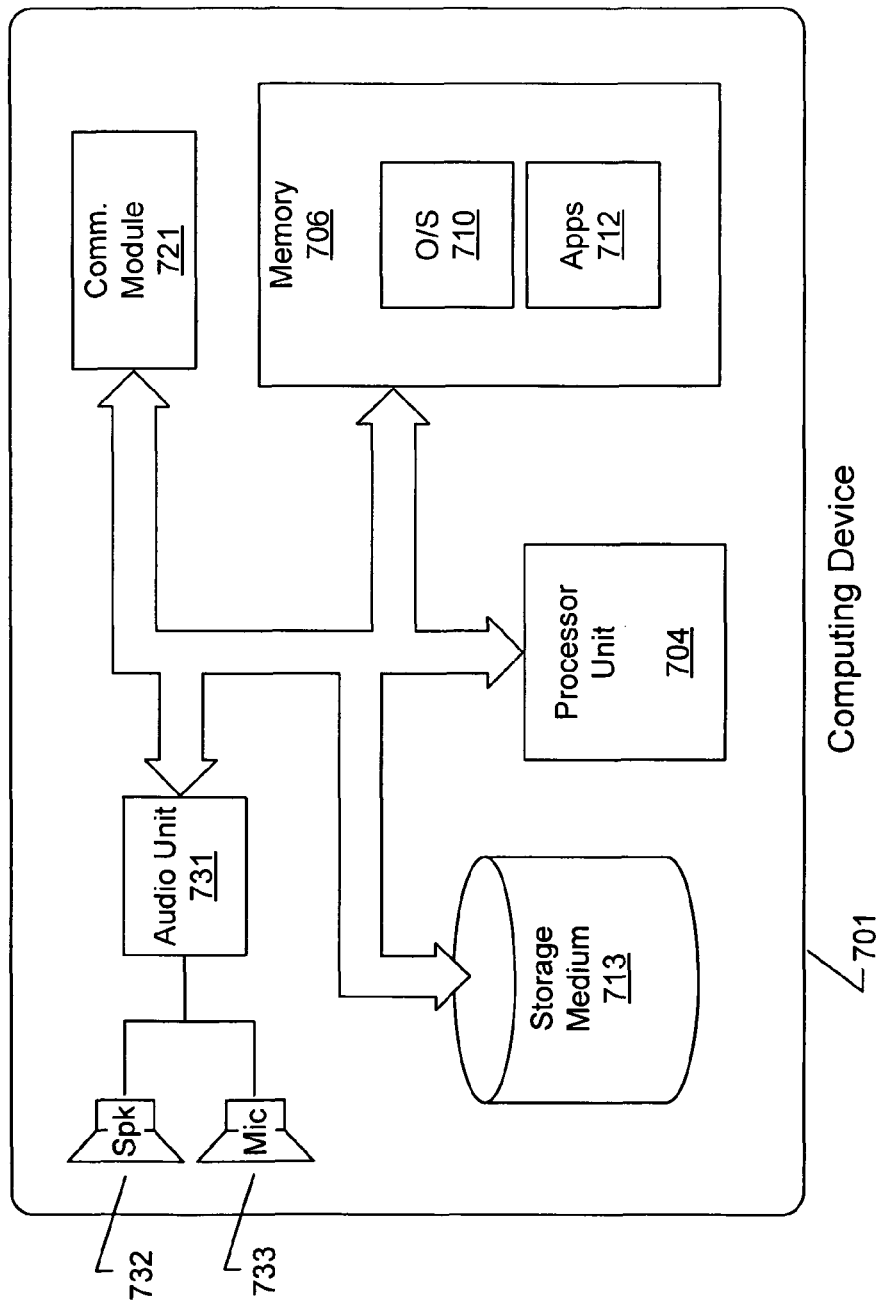
FIG. 7 is a functional block diagram generally illustrating the core components of a sample computing device in which implementations of the invention are particularly applicable.

FIG. 7 is a functional block diagram generally illustrating the core components of a sample computing device 701 in which implementations of the invention are particularly applicable. The computing device 701 could be any fixed computing device, such as a desktop computer or server.

In this example, the computing device 701 includes a processor unit 704, a memory 706, a storage medium 713, and an audio unit 731. The processor unit 704 advantageously includes a microprocessor or a special-purpose processor such as a digital signal processor (DSP), but may in the alternative be any conventional form of processor, controller, microcontroller, or state machine. The processor unit 704 is coupled to the memory 706, which is advantageously implemented as RAM memory holding software instructions that are executed by the processor unit 704. In an alternate embodiment, the memory 706 could be composed of firmware or flash memory. In this embodiment, the software instructions stored in the memory 706 include an operating system 710 and one or more other applications 712, such as a contact-based server application.

The mobile device 701 also includes a communications module 721 that enables bidirectional communication between the computing device 701 and one or more other computing devices, such as the mobile device. The communications module 721 may include components to enable RF or other wireless communications, such as a cellular telephone network, Bluetooth connection, wireless local area network, or perhaps a wireless wide area network. Alternatively, the communications module 721 may include components to enable land-line or hard-wired network communications, such as an Ethernet connection, RJ-11 connection, universal serial bus connection, IEEE 1394 (Firewire) connection, or the like. These are intended as non-exhaustive lists and many other alternatives are possible. The audio unit 731 is a component of the mobile device 701 that is configured to convert signals between analog and digital format. The audio unit 731 is used by the mobile device 701 to output sound using a speaker 732 and to receive input signals from a microphone 733.

FIG. 7 illustrates only certain components that are generally found in many conventional computing devices. Very many other components are also routinely found in particular implementations, and in certain rare cases, some components shown in FIG. 7 may be omitted. However, the computing device 701 shown in FIG. 7 is typical of the computing devices commonly found today.

Illustrative Processes Performed by Implementations of the Invention

Described next are several illustrative processes that may be implemented by computing and/or telecommunications equipment to embody aspects of the invention. The mechanisms and devices described above may be used where appropriate, but it is envisioned that the following processes may be implemented using other mechanisms and devices equally without departing from the spirit and scope of the invention.

Figure 8:
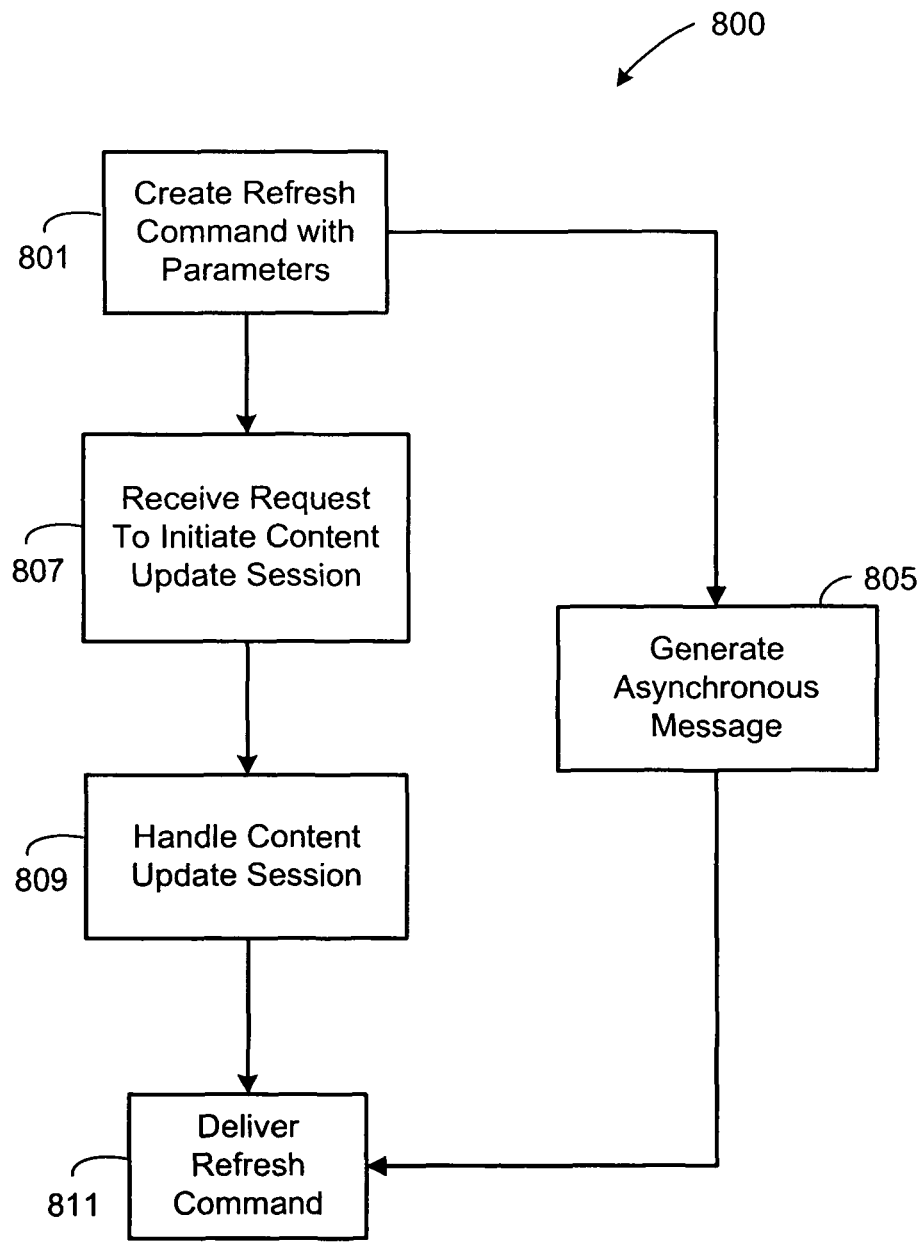
FIG. 8 is an operational flow diagram generally illustrating steps in a process for instructing a mobile device to perform a content update.

FIG. 8 is an operational flow diagram generally illustrating steps in a process for instructing a mobile device to perform a content update. The process 800 begins at step 801 where a content server is configured to serve content to one or more mobile devices, and at least one mobile device is configured to retrieve the content from the content server.

At step 801, the content server creates a refresh command that will, when executed, cause a mobile device to connect to the content server and request new content. The refresh command may take many forms, such as those described at length above. More specifically, the refresh command may include parameters or other mechanisms that allow the refresh command to be scheduled for future execution. In particular, the refresh command may include a repeatdelay parameter that identifies a time period during which an identical refresh command should not be executed again.

The refresh command may additionally identify what content to retrieve from the content server, or may simply indicate to connect to the content server and retrieve any new or changed content. Additionally, the refresh command could be configured to instruct the mobile device to connect to the content server and retrieve all available content, any subset of the available content, or even no content at all. From step 801, the process 800 may either continue at step 805 or at step 807, whichever is appropriate under the circumstances.

At step 805, the content server creates an asynchronous message for delivery to the mobile device that includes the refresh command. One example of a type of asynchronous message may be an SMS message, an MMS message, an e-mail message, or the like. Other types of asynchronous messages include Short Data Burst Messages, UDP Packets, and the like. The asynchronous message is used to transmit a command to the mobile device without waiting for the mobile device to connect to the content server. In one specific implementation, the asynchronous message may be an SMS message that includes the refresh command and any applicable parameters, such as the repeatdelay parameter.

At step 807, the content server receives a request to initiate a content update session from a mobile device. As described above, the mobile device is configured to connect to the content server, perhaps using a wireless connection. The content update session may be an HTTP session or the like. Once the request is received, the process 800 proceeds to step 809.

At step 809, the content server handles the content update session, such as by determining if any new or changed content is available at the content server. If so, the content server delivers the new or changed content to the mobile device. As mentioned above, although described here as new or changed content, the content update session could involve any manner of content delivery, such as new content, changed content, old content that has already been delivered, old content that has not yet been delivered, specific content identified by the mobile device, all content that is available at or through the content server, or the like.

It should also be mentioned that although returning new content is the most likely way to handle the content update session (meaning respond to the refresh command), other alternatives are possible. In fact, the server could handle the content update session in any arbitrary way, and is under no technical obligation to return new content. In fact, the client may be requesting certain content at the content server that simply hasn't changed since the last content update session. In this case, the content server may handle the request by ignoring it, or perhaps by returning content other than what was requested.

At step 811, the content server delivers to the mobile device the refresh command created at step 801. The delivery mechanism depends on how the process 800 arrived at this delivery step. In other words, if the process 800 arrived at the delivery step 811 as a result of the occurrence of a content update session, then the delivery mechanism may be to issue the refresh command using the HTTP protocol, or the like. Alternatively, if the process 800 arrived at the delivery step 811 in connection with the creation of an asynchronous message, the delivery mechanism may be the SMS protocol, or the like. These and many other delivery transports may be used to deliver the refresh command in either an asynchronous or interactive manner.

It should be noted that the order of the steps of process 800 as illustrated is not necessarily the only order in which they may be performed. To the extent possible, the steps of the process 800 may be performed in any arbitrary order. For example, it is possible that the refresh command may be created (step 801) after the content update session has been initiated (step 807) or even after the new or changed content has been delivered (step 809). Accordingly, there should be no significance attached to the particular order of the steps as illustrated in FIG. 8 and described here.

Figure 9:
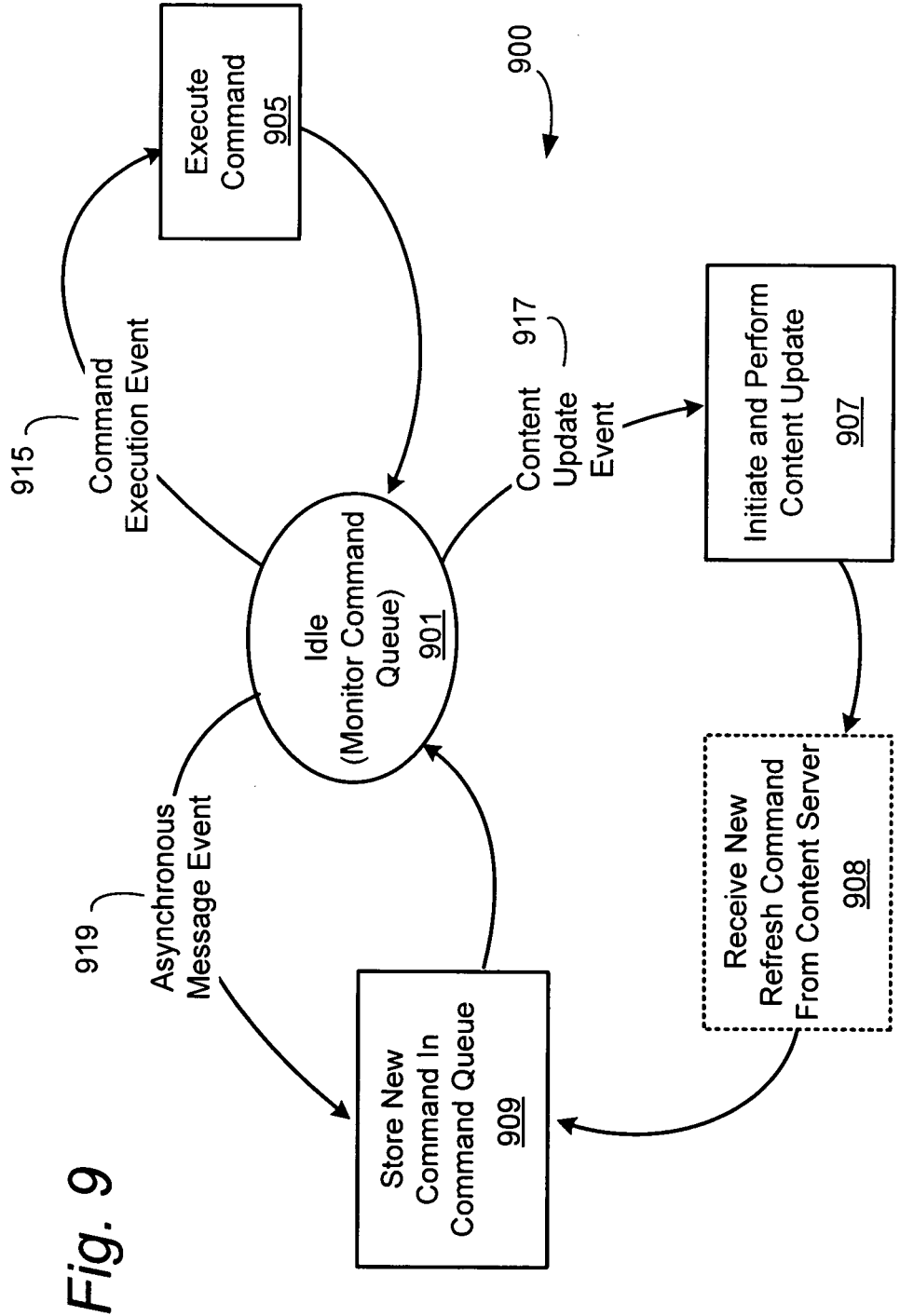
FIG. 9 is a state diagram generally illustrating operations performed by a process for refreshing content stored on a mobile device.

FIG. 9 is a state diagram generally illustrating operations performed by a process 900 for refreshing content stored on a mobile device. In this particular embodiment, the mobile device includes a content-based application that stores local content and retrieves new content from a content server.

The process 900 begins with the mobile device in the idle state 901, where the mobile device awaits the occurrence of any one or more events that move the process 900 out of the idle state 901. Certain of those events are described below. While in the idle state 901, a component of the mobile device continuously monitors a command queue to determine if any commands in the queue are due for execution. The command queue is a repository for commands that may be executed at some point in the future. As those commands come due, the mobile device executes those commands as appropriate.

When a command comes due for execution (execute event 915), the mobile device executes the command (step 905) as appropriate for the particular command. In some cases, it may be appropriate to ignore the particular command. For instance, if a previous instance of the same command included a repeatdelay parameter, and the time specified by that parameter has not yet elapsed, it may be appropriate to omit the command.

Many different commands may be executed. In one example, the time may have come to execute a refresh command that was stored in the command queue. As described above, the refresh command instructs the mobile device to perform a content update to refresh any locally stored content on the mobile device, or otherwise retrieve new content from the content server. Accordingly, executing the refresh command may trigger a content update event 917. When the execution is complete, the mobile device returns to the idle state 901.

A content update event 917 occurs when the mobile device is instructed to perform a content update to retrieve content from the content server. The content update event 917 may occur for many reasons, such as a refresh command coming due as just described. However, the content update event 917 may also occur for many other reasons, such as the user manually activating a content update or the initialization of the content-based application on the mobile device.

In response to the content update event 917, the mobile device connects to the content server and performs a content update (step 907). The content update may involve initiating a content update session with the content server, and retrieving new or changed content. The content update could also involve simply determining if new or changed content is available at the content server, or any other form of content. In addition, one or more new refresh commands may be retrieved from the content server (step 908). The new refresh command may include information that instructs the mobile device to perform another content update at some predefined time in the future. It will be appreciated that the step of retrieving a new command (step 908) is optional, as content updates may occur without a new command being retrieved.

An asynchronous message event 919 occurs if the mobile device receives an asynchronous message that includes a command, such as a new refresh command. One form of asynchronous message is an SMS message, as has been described. The asynchronous message includes the refresh command and may additionally include parameters that identify when the refresh command is to be performed and other criteria that affect the refresh command, as has been described. The asynchronous message may be received using ordinary messaging protocols and mechanisms.

At step 909, if a new command is received either during a content update (step 908) or as a result of an asynchronous message event 919, the new command is stored in the mobile device's command queue(step 909), and the process returns to the idle state 901. As mentioned above, at the idle state 901 the command queue is continuously monitored for commands that become due, such as the new refresh command. Thus, in due time, the new refresh command will be executed and the process 900 will continue.

It will be appreciated that the process 900 enables the content server to control or regulate how frequently and in what manner the mobile device performs a content update by issuing new refresh commands. Since the content server has the most current and accurate knowledge of when content is available, the process 900 avoids the need for the mobile device to repeatedly query the content server for new content. This feature improves network efficiency, and can save the user/subscriber money in wireless network usage costs.

Figure 10:
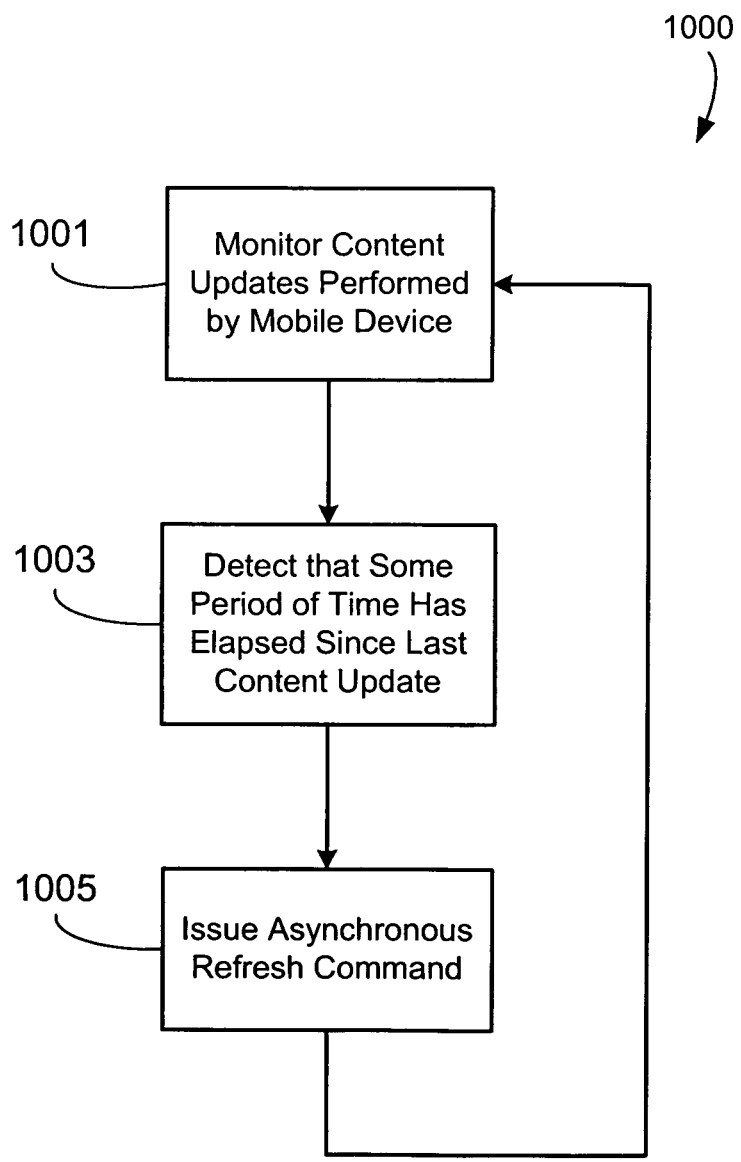
FIG. 10 is an operational flow diagram generally illustrating steps in a process for performing a "command queue revival" in a system having a content server that issues commands to a client, the client being configured to retrieve content from the content server.

FIG. 10 is an operational flow diagram generally illustrating steps in a process 1000 for performing a "command queue revival" in a system having a content server that issues commands to a client, the client being configured to retrieve content from the content server. The command queue revival is the technique of reviving a "refresh command chain" that may have become broken somehow, as is described more fully here.

A content-based application (a "client") using the content update system described above typically receives at least one refresh command (and may receive multiple) each time it contacts the content server for a content update, thus maintaining a regular content update schedule via these chained refresh commands. If the client is running on a mobile device that is powered off for an extended period of time or is disconnected from the network in some other way, it is possible for the chain of refresh commands to break, thereby breaking the content update schedule.

For example, consider a weather report application (the client) that hasn't contacted the content server for the latest weather data within a few days because it has been powered down. Commands in the client's command queue may expire. When powered on, the client discards the expired commands, which may leave no remaining refresh commands to be executed. This breaks the refresh command chain.

The process 1000 described here enables the content server to revive the content refresh schedule in such a case. The process 1000 begins at step 1001 where the content server passively monitors the content updates that have been performed by each subscribed client. The monitoring activity may be as simple as periodically evaluating the last time each client contacted the content server, or more complex such as maintaining information that compares the periodicity of the client's previous content update schedule to the time since the client's last contact.

At step 1003, the content server detects that a particular client has not contacted the content server for more than some predetermined period of time. The period may be based on an elapsed time since the previous content update, or perhaps some period of time that the client is overdue for performing its next content update. Since the content server generally issues the refresh commands to keep the client on a regular content update schedule, the content server has knowledge of approximately when the client should initiate the next content update. Alternatively, the content server can use any other method of determining at what point the client is overdue for a content update.

At step 1005, the content server, having determined that the client is overdue for a content update, sends the client an asynchronous message (e.g., an SMS message) containing a refresh command to be executed immediately. Upon receipt, the client would contact the content server for the latest content updates and receive a new refresh command, thus re-establishing the refresh command chain.

Figure 11:
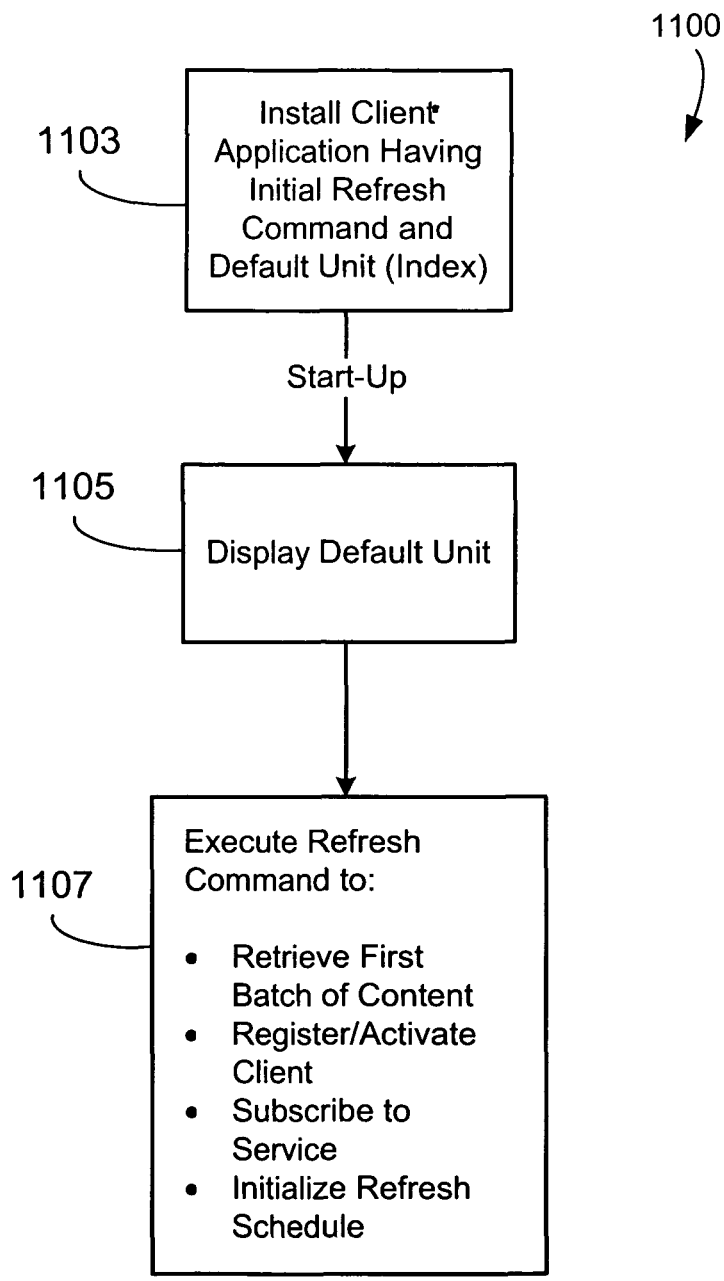
FIG. 11 is an operational flow diagram generally illustrating the steps of a process for initializing a content-based application on a mobile device.

FIG. 11 is an operational flow diagram generally illustrating the steps of a process 1100 for initializing a content-based application (client) on a mobile device. The process 1100 begins at step 1103, where the client is installed on the mobile device. The client is installed with a default unit or page to display on initialization, and an initial refresh command to cause the client to perform a content update on initialization. For example, a resource can be set in a resource file installed with the client. This resource could contain the initial refresh command to execute when the client is started for the first time.

At initial start-up, the process 1100 moves to step 1105, where the default unit, (e.g., an "index" unit), is displayed. Displaying the default unit at start-up provides a mechanism to present the user with some content while new content is being retrieved. The name of the default unit can be stored in a second resource and can be overridden.

At step 1107, the initial refresh command is executed. The initial refresh command can be complete with parameters, such as retryCount, and displayWhile. This allows the client to be distributed with minimal content and retrieve new content the first time it is launched. The initial refresh command can also be used as a mechanism for the application to register or activate itself when initialized. The initial refresh command could also be used as a mechanism for subscribing to a service if the client operates on a subscription basis and initializing the content update schedule. Alternatively, a button or link in the default unit could prompt the user to start the subscription.

Although the processes presented in this document have been illustrated and described sequentially in a particular order, in other embodiments, the steps of the processes may be performed in different orders, multiple times, and/or in parallel. Further, in some embodiments, one or more steps described in the several processes may be performed as separate steps, combined into fewer steps, or possibly omitted entirely.

While the foregoing disclosure shows illustrative embodiments of the invention, it should be noted that various changes and modifications could be made to the described embodiments without departing from the spirit and scope of the invention as defined by the appended claims. Furthermore, although elements of the invention may be described or claimed in the singular, the plural is contemplated unless limitation to the singular is explicitly stated.

Appendix: Commands Table

The following commands may be used in implementations of the invention.

| Command | Description |
| --- | --- |
| refresh | Causes the client to initiate a content update session by contacting a content server and requesting new content as identified by parameters of the refresh command.<br>This command may be abbreviated with the letter "r" which is mostly of use when sent with SMS. |
| delete-unit | Deletes the listed units. It is handled the same whether it occurs in a URL or a header, though putting it in a URL is probably not the most useful thing to do. The arguments consist of a list of units to delete.<br>An example of the header is:<br>Cmd: delete?unit=tarsier.jpg;unit=ayeaye.ctt<br>This command may be abbreviated with the letter "x.u. |
| delete-all-units-but | This command is similar to the above delete, but a little more powerful and dangerous. Instead of listing to the units that should b deleted, the units that should be kept are deleted. All other units are deleted.<br>This command may be abbreviated with the letter "y". |
| display-unit | This command causes the client to display the named unit on the screen for the user. In the header format it sets the current displayed unit and next time the client displays something it will go to that unit. If multiple display-unit commands arrive, only the last one will have an effect.<br>Note that display-unit commands can arrive via pushed messages or via HTTP headers. That is it may be useful to put the display-unit command in content that arrives even when the user is not using the application. It will |

| Command | Description |
|---|---|
| | have an affect next time the user opens the application.<br>Here is an example of a header:<br>Cmd: display-unit?drill.ctt<br>This command may be abbreviated with the letter "d" which is mostly of use when sent with SMS. |
| display-previous-unit | This command instructs the client to display the previously displayed unit. This is similar to issuing a "back" command in a web browser. It allows the server to generate content that may be accessed from several paths:<br>Cmd: display-previous-unit |
| playafter | This command instructs the client to play a previously downloaded unit. It does the same thing as a "playafter" parameter in a refresh command. It takes the name of the unit to play, which must be present locally:<br>Cmd: playafter?unit.ctt<br>This command overrides the playafter parameter included with the refresh command. It provides the server a last minute method to alert the user to special content. |
| beepafter | This command is similar to "playafter", except it plays a sound or vibrate built in to the device the client is running on. The tones the beepafter command can invoke are built into the client and are not sent by the server. This gives the server a quick and easy way to alert the user to special content in a way consistent with the UI of the device and without having to push a unit to play-<br>The following values may be specified which map directly to some built-in beep types:<br>Alt   alert type beep<br>Rmd   reminder type beep<br>Msg   new message type beep<br>Err   error beep<br>Avb   short, alert type vibrate<br>Rvb   longer, reminder type vibrate<br>Cmd: beepafter?rvb<br>This command overrides the beepafter parameter included with the refresh command. It provides the server a last minute method to alert the user to special content. |
| setvar | This command allows the server to set a local variable (e.g. "baseurl") that affects the behavior of the client. The server may set the "baseurl" variable as below:<br>Cmd: setvar?baseurl=http%3A%2F%2Fsomeurl<br>The client uses the "baseurl" variable when interpreting refresh commands. This is most useful for SMS refresh commands although it can be used throughout content to reduce size. |
| save | Instructs the client to save a downloaded unit to a specific place. This could be used to save ringers, pictures, and the like in the appropriate places. The save command could take the following form:<br>Cmd:save?unit=xxx;path=yyy<br>Where "xxx" is the name of the unit to be saved and "yyy" indicates where to save the unit. If the path parameter is omitted, the client places the copy of the file in a shared directory.<br>If the client supports this functionality it will list "save" as one of the supported commands in a capabilities header. |
| absave | This command is used to create an address book entry on the client. It may be included in a link off of a page of contact information for some person, for example, allowing the user to save the contact information to the address book if desired.<br>Cmd: absave?field1=value1j;...i fieldn=valuen<br>The save command includes a list of field value pairs. The fields map directly to supported address book fields.<br>Additionally, the link may include a "cat" parameter to specify the address book category.<br>If the client supports adding contacts to the address book, "absave" will be listed in the capabilities header. If the client does not list this capability, the server should not include "absave" links. |

Appendix: Parameters Table

In general any parameter can be used with any command though some of the combinations may not be very useful.

| Parameter | Description |
|---|---|
| URL | Specifies a location from which to retrieve new content, and may identify a particular unit to fetch. The URLs are listed as arguments in URL standard query string. Thus a refresh fetching the URLs http://server.com/baboon.jpg, http://server.com/orang.jpg and http://server.com/gibbon.jpg would be:<br>Stein-cmd:refresh?url=http://server.com/baboon.jpg; |

-continued

| Parameter | Description |
|---|---|
| | http://server.com/orang.jpg;http://server.com/gibbon.jpg<br>Note that an alternative to listing a series of URLs as above is to put the three jpg files in a multipart/x.content-aggregate structure and have one URL to get it. That causes only one HTTP transaction rather than three.<br>The client allows multiple URLs for greater flexibility. It may not be convenient to put all items into one aggregate because they come from different servers.<br>If the baseurl variable is set, the client win combine it with the URLs specified in the command according to RFC2396. This is particularly useful for refresh commands sent in SMS messages as these are very limited in length. |
| Time | The time parameter gives a date and time when the command should be executed. This allows the server to have commands executed in the future, which avoids complete dependency on SMS notifications. For example, the execution of a refresh command can retrieve another refresh command to be executed a few hours or days later.<br>The date format may be in accordance with RFC-822 format as modified by RFC-1123. Alternatively, a more compact date format could be used with the number of seconds since Jan. 1, 1970 (UNIX time) as hex digits.<br>Following the time value may be a keyword specifying whether time is absolute or relative to the local time zone. If the keyword is "GMT" or absent, the time is absolute, and will be executed at that time. This is useful for commands that may be sent to clients in different time zones but which should be executed at the same absolute time, such as to retrieve stock quotes at the opening and closing of the stock market.<br>If the keyword is "local" then the time is based on the local time on the mobile device, whatever time zone it might be in. This format may be useful to cause content updates to happen at off hours like 2:00 am local time.<br>The keywords can be abbreviated as "L" for "local" or "G" for "GMT.<br>An example of the syntax is:<br>time=17 Oct 2004 08:42 local<br>Or:<br>time=A745243 local<br>Or:<br>t=A7452434L<br>This parameter may be abbreviated with the letter "t". |
| Expires | Specifies a date after which the corresponding command should not be executed. The date format is the same as for the time parameter.<br>This parameter may be abbreviated with the letter "e". |
| RepeatDelay | Specifies a time in minutes during which this command should not be repeated if received again from the server. It does not affect commands executed on request of the user.<br>The value is an integer specifying a number of minutes, for example "15". Absence of this parameter is equivalent to the value 0. The value may also be the string "infinity".<br>Note that while "infinity" implies the command should never be executed again, imposing this restriction in practice is impractical. The client would have to track every command it ever executed. In practice the client tracks the commands for as long as practical, which could be at least two days.<br>It is very useful, perhaps mandatory, to sometimes push the refresh command to the client. For example, if the phone has been turned off for a long period of time, there may be many refresh commands backed up to fetch the same content. It would be very wasteful to execute the refresh command over and over when the phone is first turned on again. If all the commands have a repeat delay of 30 minutes, then despite the number of commands, it will only be executed once in 30 minutes. This handles the case where SMS messages may trickle into a phone over a 30-minute period.<br>Note that subsequent commands that arrive during the RepeatDelay period of a first command are completely discarded. In particular any RepeatDelay parameters of those subsequent commands do not shorten or extend the current delay period set by the first command.<br>The server could respond to fetches of the same unit multiple times in many different ways. For instance, the server could return exactly the same data each time, it could return updated data each time, or it could change the entire state of the data each time. In the first case, the RepeatDelay should be very large (e.g., "infinite"), in the second case the RepeatDelay should be similar to the frequency of update of the data, and in the last case it should be absent or zero.<br>This parameter may be abbreviated with the letter "dt". |
| RetryCount | Specifies a number of times to retry the corresponding command in the case of a failure. Failures can occur for many reasons, such as because a network connection cannot be obtained, because a voice call is active, because the server is unavailable, or the like.<br>If the RetryCount in unset it will default to 2.<br>This parameter may be abbreviated with the letter "c". |

-continued

| Parameter | Description |
|---|---|
| RetryMin | Specifies a number of minutes between each retries for an unsuccessful execution of the corresponding command. If "E" is appended to the value, the retry will back off exponentially by doubling the time for each retry until the retry count is reached. For example if you give value as "RetryMin=3e" then the retry will wait 3 minutes, then 6, then 12, then 24.<br>A default value, such as 10 minutes, could be used if RetryMin is unset.<br>This parameter may be abbreviated with the letter t". |
| PlayAfter | Specifies a URL of a unit to play after the corresponding command has been executed. The URL should point to a local resource rather than one that must be fetched over the network. This parameter is most useful for the refresh command, in particular when some data for an application has been updated but the application is not running.<br>This parameter may be abbreviated with the letter "p". |
| PlayWhile | Specifies a URL of a unit to play while the corresponding command is being executed. It is most useful for commands that may execute for a relatively long period, such as the refresh command. |
| BeepAfter | Instructs the client to play a certain beep tone or vibrate alert once the corresponding command has completed. The tones the BeepAfter parameter can invoke should be built into the client and not sent by the server. The following values may be specified, which could map directly to certain built-in beep types:<br>Alt    alert type beep<br>Rmd  reminder type beep<br>Msg  new message type<br>Err    beep error beep<br>Avb  short, alert type vibrate<br>Rvb  longer, reminder type vibrate<br>This parameter may be abbreviated with the letter "b". |
| DisplayAfter | Specifies a URL of a unit to show after a command is executed. It is similar to executing a display-unit command.<br>This parameter may be abbreviated with the letter "a". |
| DisplayWhile | Specifies a URL of a unit to show while a command is being executed. It does not affect the currently displayed unit. The specified unit should be a local resource rather than one fetched from the network. |

Appendix: HTTP Headers Table

The following table lists illustrative headers that may be passed in conjunction with a refresh command using HTTP as a transport protocol. The headers identified here are by way of example only, and this table does not include an exhaustive list.

| Header | Description |
|---|---|
| Phone Number ("min") | Used to transmit the phone number of the mobile device. A special privilege may be required for this because some carriers and users restrict access to phone numbers because of privacy policy. In this case the value returned may be "%EPRIVLEVEL".<br>On rare occasions the MIN on the handset can change. This occurs if a user changes his phone number. If an application wishes to accommodate this it should request the MIN every time.<br>An example of a returned header is:<br>Stein-Min: 858-867-5309 |
| Platform ID ("pid") | An integer that indicates the make and model of the handset. Note that this should be used only if a detail about the handset cannot be discovered otherwise.<br>An example of a returned header is:<br>Stein-PID: 100234 |
| Carrier ID ("cid") | An integer that indicates which home carrier or operator the handset is associated with. It does not change as the handset roams from one carrier to another.<br>An example of a returned header is:<br>Stein-CID: 10042 |
| Client Version ("vers") | Returns the version of the client the handset has installed.<br>Stein-version: 1.0 |
| Capabilities ("cap") | Returns a list of capabilities to the server. Whether the client supports the ABSave or Save commands, for example, is indicated in this header. The supported commands will vary from handset to handset with different installed software.<br>An example of a returned header is:<br>Stein-capabilities: ABSave, sa.vea, |
| GPS location ("loc") | Returns the current GPS location of the handset.<br>No example is given. |

-continued

| Header | Description |
| --- | --- |
| IKeyMaker authentication credentials | Returns an authentication credential. No example is given. |
| Cookies | The client and server may basically support cookies like a web browser. A client can use them to identify the user. No special "hdr" parameter is required for cookies. |

What is claimed is:

1. A system for influencing a content update schedule on a mobile device, comprising:
a server configured with a processor, a memory, and a storage medium, the storage medium being encoded with a server application that when executed by the processor runs in the memory and causes the server to:
create a refresh command that, when executed, initiates a content update session, the refresh command including a repeat delay parameter that defines a period during which another refresh command issued to the mobile device that commands the mobile device to refresh the same content as the refresh command will be ignored; and
issue the refresh command to the mobile device having a content-based application configured to retrieve content from a content server.

2. The system recited in claim 1, wherein the refresh command is issued to the mobile device during the content update session initiated by the mobile device.

3. The system recited in claim 1, wherein the refresh command is issued to the mobile device in an asynchronous message.

4. The system recited in claim 3, wherein the asynchronous message uses a Short Messaging Service (SMS) protocol.

5. The system recited in claim 3, wherein the refresh command further comprises additional parameters that influence how the refresh command is executed.

6. The system recited in claim 5, wherein the additional parameters include a time parameter that specifies when the refresh command should be executed.

7. The system recited in claim 5, wherein the additional parameters include a URL parameter that specifies the content to be retrieved.

8. The system recited in claim 5, wherein the additional parameters include an expires parameter that specifies a time after which the refresh command should not be executed.

9. The system recited in claim 1, wherein the refresh command is further configured to influence how the refresh command is executed.

10. The system recited in claim 1, wherein the refresh command further comprises additional parameters that influence how the refresh command is executed.

11. The system recited in claim 10, wherein the additional parameters include a time parameter that specifies when the refresh command should be executed.

12. The system recited in claim 10, wherein the additional parameters include a URL parameter that specifies the content to be retrieved.

13. The system recited in claim 10, wherein the additional parameters include an expires parameter that specifies a time after which the refresh command should not be executed.

14. The system of claim 1, wherein the repeat delay parameter is configured to permit the mobile device to execute refresh commands that command the mobile device to refresh different content than the refresh command during the defined period.

15. The system of claim 1, wherein the another refresh command corresponds to identical refresh commands, as compared to the refresh command, that are received during the defined period.

16. The system of claim 1, wherein the another refresh command to be ignored during the defined period corresponds to one or more refresh commands issued to the mobile device from the server that issued the refresh command.

17. The system of claim 16, wherein the repeat delay parameter is configured to permit the mobile device to execute user-issued refresh commands that are not issued from the server during the defined period.

18. A system for scheduling a content update, comprising:
a mobile device configured with a processor, a memory, and a storage medium, the storage medium being encoded with a command queue and a content-based application that when executed by the processor runs in the memory and causes the mobile device to:
monitor the command queue for commands that are due for execution;
if a refresh command in the command queue is due for execution, determine if the refresh command is prohibited from executing due to a pending delay period set by a prior refresh command, wherein the pending delay period defines a period during which another refresh command issued to the mobile device that commands the mobile device to refresh the same content as the prior refresh command will be ignored;
if the refresh command is not prohibited by the pending delay period, execute the refresh command by contacting a content server identified in the refresh command and requesting a content update session; and
receive a new refresh command configured for execution at a predetermined time in the future.

19. The system recited in claim 18, wherein the new refresh command is received from the content server.

20. The system recited in claim 19, wherein the new refresh command is received from the content server during the content update session.

21. The system recited in claim 19, wherein the new refresh command is received from the content server as an asynchronous message separate from the content update session.

22. The system recited in claim 21, wherein the refresh command further comprises parameters that influence how the refresh command is executed.

23. The system recited in claim 22, wherein the parameters include a time parameter that specifies when the refresh command should be executed.

24. The system recited in claim 22, wherein the parameters include a URL parameter that specifies the content to be retrieved.

25. The system recited in claim 22, wherein the parameters include an expires parameter that specifies a time after which the refresh command should not be executed.

26. The system recited in claim 18, wherein the refresh command is further configured to influence how the refresh command is executed.

27. The system recited in claim 18, wherein the refresh command further comprises parameters that influence how the refresh command is executed.

28. The system recited in claim 27, wherein the parameters include a time parameter that specifies when the refresh command should be executed.

29. The system recited in claim 27, wherein the parameters include a URL parameter that specifies the content to be retrieved.

30. The system recited in claim 27, wherein the parameters include an expires parameter that specifies a time after which the refresh command should not be executed.

31. A non-transitory computer-readable medium encoded with computer-executable instructions for influencing a content update schedule on a mobile device which, when executed, perform operations comprising:
  creating a refresh command that, when executed, causes the mobile device to perform a content update that includes contacting a content server to initiate a content update session, the refresh command including a first parameter that specifies a time when the refresh command should be executed and a second parameter that specifies a period during which a subsequent refresh command issued to the mobile device that commands the mobile device to refresh the same content as the refresh command will be ignored; and
  issuing the refresh command to the mobile device.

32. The non-transitory computer-readable medium recited in claim 31, wherein issuing the refresh command is performed during the content update session.

33. The non-transitory computer-readable medium recited in claim 31, wherein issuing the refresh command is performed using an asynchronous message transfer mechanism.

34. The non-transitory computer-readable medium recited in claim 33, wherein the asynchronous message transfer mechanism comprises a Short Messaging Service (SMS) protocol.

35. The non-transitory computer-readable medium recited in claim 31, wherein at least one of the first and second parameters include a URL parameter that specifies the content to be retrieved.

36. The non-transitory computer-readable medium recited in claim 31, wherein at least one of the first and second parameters include an expires parameter that specifies a time after which the refresh command should not be executed.

37. The non-transitory computer-readable medium recited in claim 31, wherein the parameters include a URL parameter that specifies the content to be retrieved.

38. The non-transitory computer-readable medium recited in claim 31, wherein the parameters include an expires parameter that specifies a time after which the refresh command should not be executed.

39. The non-transitory computer-readable medium recited in claim 31, wherein the refresh command further comprises instructions to influence how the refresh command is executed.

40. A non-transitory computer-readable medium encoded with computer-executable instructions for scheduling a content update which, when executed, perform operations comprising:
  receiving a refresh command that specifies a time when the refresh command should be executed;
  storing the refresh command in a command queue on a mobile device;
  monitoring the command queue to determine if any commands in the command queue are due for execution;
  if the refresh command is due to be executed, determining if the refresh command is prohibited from executing by a parameter set in a previous refresh command, wherein the parameter defines a period during which another refresh command issued to the mobile device that commands the mobile device to refresh the same content as the previous refresh command will be ignored; and
  if the refresh command is not prohibited, executing the refresh command by contacting a content server and initiating a content update session.

41. The non-transitory computer-readable medium recited in claim 40, wherein the refresh command is received from the content server.

42. The non-transitory computer-readable medium recited in claim 41, wherein the refresh command is received from the content server during the content update session.

43. The non-transitory computer-readable medium recited in claim 41, wherein the refresh command is received from the content server as an asynchronous message separate from the content update session.

44. The non-transitory computer-readable medium recited in claim 41, wherein the parameters include a URL parameter that specifies the content to be retrieved.

45. The non-transitory computer-readable medium recited in claim 41, wherein the parameters include an expires parameter that specifies a time after which the refresh command should not be executed.

46. The non-transitory computer-readable medium recited in claim 41, wherein the parameters include a time parameter that specifies when the refresh command should be executed.

47. The non-transitory computer-readable medium recited in claim 41, wherein the parameters include a URL parameter that specifies the content to be retrieved.

48. The non-transitory computer-readable medium recited in claim 41, wherein the parameters include an expires parameter that specifies a time after which the refresh command should not be executed.

49. A method for influencing a content update schedule on a mobile device, comprising:
  creating a refresh command that, when executed, causes the mobile device to perform a content update that includes contacting a content server to initiate a content update session, the refresh command including a first parameter that specifies a time when the refresh command should be executed and a second parameter that defines a period during which a subsequent refresh command issued to the mobile device that commands the mobile device to refresh the same content as the refresh command will be ignored; and
  issuing the refresh command to the mobile device.

50. The method recited in claim 49, wherein issuing the refresh command is performed during the content update session.

51. The method recited in claim 49, wherein issuing the refresh command is performed using an asynchronous message transfer mechanism.

52. The method recited in claim 51, wherein the asynchronous message transfer mechanism comprises a Short Messaging Service (SMS) protocol.

53. The method recited in claim 49, wherein 59, 60 the first and second parameters include a URL parameter that specifies the content to be retrieved.

54. The method recited in claim 49, wherein at least one of the first and second parameters include an expires parameter that specifies a time after which the refresh command should not be executed.

55. The method recited in claim 49, wherein the parameters include a URL parameter that specifies the content to be retrieved.

56. The method recited in claim 49, wherein the parameters include an expires parameter that specifies a time after which the refresh command should not be executed.

57. The method recited in claim 49, wherein the refresh command further comprises influencing how the refresh command is executed.

58. A method for scheduling a content update, comprising:
receiving a refresh command that specifies a time when the refresh command should be executed;
storing the refresh command in a command queue on a mobile device;
monitoring the command queue to determine if any commands in the command queue are due for execution; and
if the refresh command has become due for execution and its execution is not prohibited due to a pending delay period set by a prior refresh command, executing the refresh command by contacting a content server and initiating a content update session, wherein the pending delay period defines a period during which another refresh command issued to the mobile device that commands the mobile device to refresh the same content as the prior refresh command will be ignored.

59. The method recited in claim 58, wherein the refresh command is received from the content server.

60. The method recited in claim 59, wherein the refresh command is received from the content server during the content update session.

61. The method recited in claim 59, wherein the refresh command is received from the content server as an asynchronous message separate from the content update session.

62. The method recited in claim 61, wherein the asynchronous message comprises a Short Message Service (SMS) message.

63. The method recited in claim 61, wherein the refresh command further comprises parameters that influence how the refresh command is executed.

64. The method recited in claim 63, wherein the parameters include a URL parameter that specifies the content to be retrieved.

65. The method recited in claim 63, wherein the parameters include an expires parameter that specifies a time after which the refresh command should not be executed.

66. The method recited in claim 58, wherein the refresh command further comprises influencing how the refresh command is executed.

67. The method recited in claim 58, wherein the refresh command further comprises parameters that influence how the refresh command is executed.

68. The method recited in claim 67, wherein the parameters include a URL parameter that specifies the content to be retrieved.

69. The method recited in claim 67, wherein the parameters include an expires parameter that specifies a time after which the refresh command should not be executed.

70. A system for influencing a content update schedule on a mobile device, comprising:
means for creating a refresh command that, when executed, causes the mobile device to perform a content update that includes contacting a content server to initiate a content update session, the refresh command including a first parameter that specifies a time when the refresh command should be executed and a second parameter that specifies a period during which a subsequent refresh command issued to the mobile device that commands the mobile device to refresh the same content as the refresh command will be ignored; and
means for issuing the refresh command to the mobile device.

71. A system for scheduling a content update, comprising:
means for receiving a refresh command that specifies a time when the refresh command should be executed;
means for storing the refresh command in a command queue on a mobile device;
means for monitoring the command queue to determine if any commands in the command queue are due for execution; and
if the refresh command has become due for execution and its execution is not prohibited by a parameter of a prior refresh command, means for executing the refresh command by contacting a content server and initiating a content update session, wherein the parameter defines a period during which another refresh command issued to the mobile device that commands the mobile device to refresh the same content as the prior refresh command will be ignored.

* * * * *